United States Patent [19]

Van De Vanter

[11] Patent Number: 5,805,889
[45] Date of Patent: Sep. 8, 1998

[54] SYSTEM AND METHOD FOR INTEGRATING EDITING AND VERSIONING IN DATA REPOSITORIES

[75] Inventor: Michael L. Van De Vanter, Mountain View, Calif.

[73] Assignee: Sun Microsystems, Inc., Mountain View, Calif.

[21] Appl. No.: 545,901

[22] Filed: Oct. 20, 1995

[51] Int. Cl.$^6$ .................................................. G06F 11/34
[52] U.S. Cl. ................................................... 395/703
[58] Field of Search ........................................ 395/703

[56] References Cited

U.S. PATENT DOCUMENTS

| | | | |
|---|---|---|---|
| 4,558,413 | 12/1985 | Schmidt et al. | 395/712 |
| 4,809,170 | 2/1989 | Leblang et al. | 395/703 |
| 5,155,847 | 10/1992 | Kironac et al. | 395/712 |
| 5,386,559 | 1/1995 | Eisenberg et al. | 395/703 |
| 5,574,898 | 11/1996 | Leblang et al. | 395/601 |
| 5,649,200 | 7/1997 | Leblang et al. | 395/703 |

OTHER PUBLICATIONS

Roy Levin, et al., The Vesta Approach to Precise Configuration of Large Software Systems (Jun. 14, 1993) Digital Systems Research Center, pp. 1–38.

Mick Jordan, et al., Software Configuration Mnagement in an Object Oriented Database (Jun., 1995) Sun Microsystems Laboratories, 13 pages.

*Primary Examiner*—Emanuel Todd Voeltz
*Assistant Examiner*—John Q. Chavis
*Attorney, Agent, or Firm*—Douglas J. Crisman; Flehr Hohbach Test Albritton & Herbert LLP

[57] ABSTRACT

A system and method for integrating versioning and editing of data repositories is disclosed. A data repository consists of a number of packages, each having at least one package version that includes at least one component. A version handler is uniquely associated with a package version being edited and monitors all versioning commands associated with that package version. A component handler is uniquely associated with a component being edited or a component in an editing chain. When associated with a component being edited, a component handler forms the exclusive interface between that component and the editor and monitors all editing actions taken with respect to its associated component. Other component handlers act as communications links between their child component handler and one parent handler (e.g., a top-level component handler is coupled to the version handler associated with the same package). By monitoring all editing actions, the present system is able to respond to versioning commands issued by a user in a coordinated manner so as to rigorously maintain configuration management. For example, in response to a user issuing an advance command, the present system constructs a new package version including components modified since the last advance and sharing components with back versions, which are retained intact. To support this coordination, the handlers are implemented as objects that encapsulate handler routines and abstract interfaces. Interfaces between a component handler and the editor opened on the component handler's component are customizable so that any editor can be used with the present system.

27 Claims, 8 Drawing Sheets

SYSTEM AND METHOD FOR INTEGRATING EDITING AND VERSIONING IN DATA REPOSITORIES

The present invention relates generally to product versioning systems and, particularly, to versioning systems for products represented as aggregations of related objects.

BACKGROUND OF THE INVENTION

A data repository is a collection of related components, or objects, stored in a computer memory that represents some product, such as a large software system, a complex document or any other kind of product that can be represented as an aggregation of related objects in a computer memory.

Generally, a data repository includes several top-level aggregates (or packages) that partition a product represented by the data repository into distinct, principal units. For example, in data repositories representing an encyclopedia or a program, the packages might correspond to volumes of the encyclopedia or program modules, respectively. Typically, each package is decomposable into parts (or components), some of which are further decomposable into sub-components and so-on. Due to the fact that data repositories are often shared, in which case multiple authors are free to make changes in various packages of the data repository, version control, or versioning, in data repositories is an important issue.

One goal of a versioning system is to impose some order on the creation of new package versions by users of a data repository. Most versioning systems are also concerned with the retention of old versions and the maintenance of the various package versions. This latter concern is important (e.g., so a user can retrieve a specific package version from the data repository), but, unlike the first goal, is not a central concern of the present invention. Consequently, the remainder of this discussion will focus on how various prior art versioning systems allow users to create new package versions.

Ideally, any system providing versioning for a data repository should allow a user to mutate the contents of the data repository in order to make progress towards the creation of a new version of a package. As the new versions are created, the data repository representing the system should also allow each version to be recovered while maintaining as compact a representation of the multiply versioned system as possible. Additionally, it is critical that the integrity of the repository, in particular, versioning and configuration information, be maintained without heroic assistance from the users of the data repository, and users of the versioning system should be able to employ any type of editor on the contents of the data repository. That is, the ideal versioning system should provide ease/flexibility of editing, and stringent control of configuration management and versioning. These twin goals are conflicting, especially in the situation where many users using many tools (e.g., editors and versioning systems) share a data repository, as in many large software development projects. Consequently, no prior art system has been able to satisfy both goals.

In the prior art, there have been many different approaches to providing versioning control within packages of a data repository. In a first approach, which we will call component-versioning, an author creates new versions of package components by saving editing changes to the components. A version of the package is then built after the fact, generally as a result of the user executing a versioning system that creates the current version of the package by assembling the latest stored versions of each of the components associated with the package. Systems implementing this component-versioning approach provide different levels of integration between the editing system and the versioning system.

For example, many current UNIX based systems (e.g., SCCS and RCS) provide component-versioning systems that are stand-alone applications. In these UNIX-based systems, the versioning system, editors and other file-oriented tools communicate directly with the data repository (which is constituted as a simple, flat file system) in terms of the basic naming facility (i.e., file names) provided by the file system. This approach provides highly desirable interoperability of many kinds of editors and versioning systems. However, because there is no real coordination between editing and versioning, which is executed only when invoked by users, several versioning errors are likely to occur. These versioning errors include: (1) race conditions when multiple users happen to simultaneously edit a single file, (2) faulty builds of a package when unsaved buffers are not incorporated in a new version of the package, and (3) the loss of newly created files because the user creating them did not inform the versioning system of their existence. Another byproduct of the lack of coordination between versioning and editing is that users have no sense of context while they are editing a component (e.g., the component's associated package version and whether any other components of the same package version have been edited). There have been other operating systems that support file systems with built-in component-versioning services: VMS (the VAX operating system) and the Domain system (developed by Apollo Computers) are but two examples (For more information on the Domain system, see David P. Leblang & Robert P. Chase, Jr.; Parallel Software Configuration Management in a Network Environment; IEEE Software vol. 4, no. 6, November 1987). Such systems provide smoother integration between versioning and editing, but are not suitable for large scale products. For example, VMS provides a simple file versioning system that creates a new file version each time a user saves editing changes to a single file. The Domain system provides a richer versioning model, but is not predicated on sharing of components among versions and does not provide coordinated editing and versioning, both of which features are needed for large product versioning. These systems are also typically able to version only simple objects (single files, for example) as opposed to the complex aggregations of objects of the sort one finds in compound documents and software configurations, thus they also do not satisfy the conflicting goals of editing ease and rigorous version control of shared, complex data repositories.

There is also a class of document management systems that provide seamless editing of complex aggregations of objects but little or no versioning. Compound document architectures, e.g., OLE from Microsoft and OpenDoc from Component Integration Laboratories, show a different approach to handling complex aggregations of objects along with the corresponding need for integrating different editors that specialize in different types of subdocuments. For example, an OLE document predominantly created in the Microsoft Word word processor might include embedded Excel spreadsheets that a user can edit using Excel spreadsheet editing commands by simply moving the cursor inside the boundaries of the spreadsheet. However, these compound document architectures do not provide any versioning of the parts of the compound document other than perhaps what might be supplied by an underlying storage mechanism that is largely unrelated to the structure of the documents.

The prior art also includes several examples of package versioning systems, which are organized around the idea that the units of the data repository that are versioned are entire packages. Examples of package-versioning systems include software configuration management systems that operate as a layer atop a simple file system (for example, TeamWare by Sun and ClearCase by Atria), as well as complex configuration systems that operate in databases (for example, see U.S. Pat. No. 5,386,559, "Variant Domains and Variant Maps in Versioned Database Management System", filed on Jul. 16, 1992 by I.B.M.). Such systems tend not to support open frameworks for editing (meaning they are not easily integrable with a wide variety of editors) and, when they do, such editing reflects the above-mentioned lack of coordination between editing and versioning, which leads to the typical versioning errors described above.

Another package-oriented configuration management system is Vesta (for more information, see Roy Levin and Paul R. McJones, "The Vesta Approach to Precise Configuration of Large Software Systems", Publication 105 of the Digital Systems Research Center, Jun. 14, 1993), aspects of which are now discussed in reference to FIGS. 1 and 2. Vesta is a configuration management system for large software projects that provides versioning of hierarchical compound designs and versions entire aggregates. Consequently, in a Vesta data repository, existing package versions and their components are immutable and there is much sharing of components between different versions of package. For example, FIG. 1 shows how Vesta would represent as a data repository 294 a software system 200 that includes three packages 210 (A), 212 (B) and 214 (C). Package B exists in two versions 216 (1) and 218 (2), which have respective top-level folder components 200 and 222 (these components are called folders because they contain other components; components that do not contain other components are called leaf components or file components). The top-level folder component 220 includes four subcomponents, files 226, 228 and 230.1 ("P") and a folder 224 ("J"), which further includes a file 232 ("Z"). The top-level folder 222 includes three of the same sub-components as the top-level folder 220 (i.e., the files 226 and 228 and the folder 224 ("J")) and a file 230.2 ("P"), which is an updated version of the file 230.1 ("P") associated with version 216 of package B. Thus, this data repository provides maximum sharing of common components among versions.

Vesta implements a typical version management policy that includes checkout, advance and checkin commands and that is predicated on the understanding that a package version cannot be advanced without it first being checked out. As shown in FIG. 2, when a user checks out a package version, Vesta's configuration management system 262 copies the version's components to a simple file system 258, where components can be edited with any editor 256, 257 provided by the host computer system. Once a version is checked out, the user creates new checkout versions by advancing the current checkout version. Each time an advance command is issued, the configuration manager 262 compares the components being edited to the current checkout version, creates new components where needed, and then creates a new checkout version that uses the new components and shares unchanged components of the current checkout version. The user can then issue a checkin command.

Due to its lack of coordination between versioning and editing, Vesta's configuration management method can result in flawless versioning only if the user (1) saves all open editing buffers before checking in the edited file system 258 and (2) informs the configuration manager 262 of any new components created during editing, along with that component's relation to existing or modified versions of existing components. Moreover, in the Vesta system, there is no versioning/context information available to users of the editors. Finally, as all editing occurs in the file system, there is much needless copying.

Thus, there is a need for a system and method for integrating versioning and editing in a shared data repository in which hierarchical designs are represented as packages made up of components. This system should support package level versioning, wherein package versions are immutable and there is extensive sharing of components between versions. The system and method for integrating versioning and editing should also provide coordinated, simplified editing by users so that new package versions are created as a natural extension of editing behavior with versioning consequences, thereby avoiding the common configuration management failures set out above. This system and method would ideally provide an open framework for editing that allows editing of components of different kinds with different kinds of editors using different types of communications between the editors and the part of the integrating system that communicates with the editors. An ideal versioning/editing system should also provide users with contextual information leading to enhanced user versioning awareness.

SUMMARY OF THE INVENTION

In summary, the present invention is a system and method for integrated editing and versioning in shared data repositories that meets the needs set out above.

More particularly, the present invention is a system and method for integrating editing and versioning in a data repository, wherein a data repository is a structured representation maintained in a computer memory of a software system having multiple packages, each of which exists in at least one package version, each including at least one component, all of which are immutable once created. The structured representation stores information about the packages, package versions and components so that any of the package versions can be recoverable from the structured representation.

The first steps of the method of the present invention include: (1) monitoring editing actions made to the components of a particular package version, and (2) monitoring all versioning commands issued by any user with respect to the same package version. Based upon the occurrence of these editing actions with versioning consequences and versioning commands, the present method updates the structured representation so as to maintain the information provided by the structured representation as components of the particular package version are being edited.

The present invention is also a configuration manager for integrating editing and versioning in a data repository, where editing involves using an editor to modify some of the components of a package version and versioning includes allowing a user to mutate contents of one package version while maintaining a record of existing versions and creating a new version. One element of the configuration manager is a component handler associated with a component being edited and the editor being used to edit the component, the component handler providing an exclusive link between the editor and the component and mediating all editing actions with versioning consequences made to the component using the editor. The present configuration manager also includes a version handler associated with one of the package versions and all of the component handlers associated with the components of the version, such that each of the component handlers is configured to communicate occurrence of the editing actions with versioning consequences and versioning commands issued by the user to the version handler. The version handler is also configured to responsively cause the component handlers associated with the components of the package version to implement versioning actions in cooperation with the editors open on each of the components.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 3:
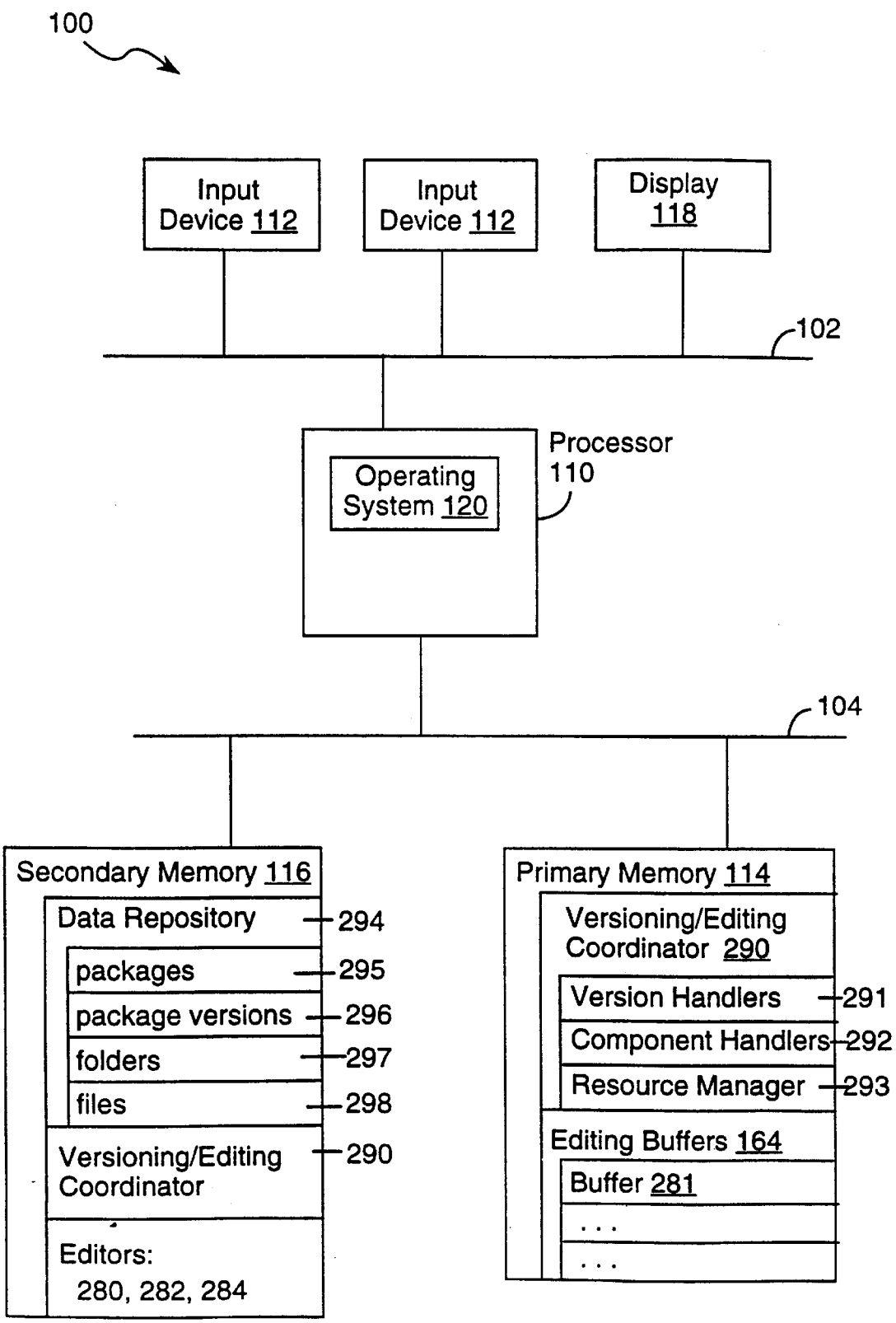
FIG. 3 is a block diagram of a computer system incorporating the present versioning system.

Referring to FIG. 3, there is shown a block diagram of a computer system 100 incorporating the versioning/editing coordinator 290 (hereinafter called the "coordinator") of the present invention. The system 100 has a processor 110 coupled to a primary memory 114 and a secondary memory 116 via a local bus 104. The system also includes at least one input device 112, such as a keyboard and/or a mouse, and a display 118 coupled to the processor via a peripheral bus 102. The system 100 is controlled by operating system software 120 executing in the processor 110. Other executable software, including the editors 280, 282, 284, and the coordinator 290, is stored in the secondary memory 116, as is a data repository 294.

As shown in FIG. 3, the coordinator 290 includes at least one version handler 291, at least one component handler 292 and a resource manager 293, all of which are described in depth below. The data repository 294 is a collection of packages 295, package versions 296 and components 297 (folders) and 298 (files) that can be stored in any format in the secondary memory 116 as long as there is a mechanism for embedding references in components that uniquely identify other components.

Before a user can begin to make changes to the data repository 294, the operating system 120 must load into the primary memory 114, and begin executing the coordinator 290, which then oversees all interactions between the editors 280, 282, 284 and the data repository 294. For example, when a user invokes an editor 280 against a component (i.e., a file or a folder) of the data repository 294, the editor 280 is loaded into the primary memory 114 if needed and then the coordinator 290 allows the editor 280 to open an editing buffer in the primary memory 114 on that element. Once the editing buffer has been opened, the user is free to edit the buffer with the input device 112 from an editing display 118; however, all user editing actions involving the actual data repository element (i.e., not the buffer) are handled by the coordinator 290. Because of its overseer position, the coordinator 290 is able to ensure that any editing actions with versioning consequences, such as when a user wishes to create a new package version, are handled conveniently in a consistent way that results in a new package version without any of the failure modes of the prior art and with contextual information available to users from the editors.

A. Coordinator 290 Block Diagram

Figure 4:
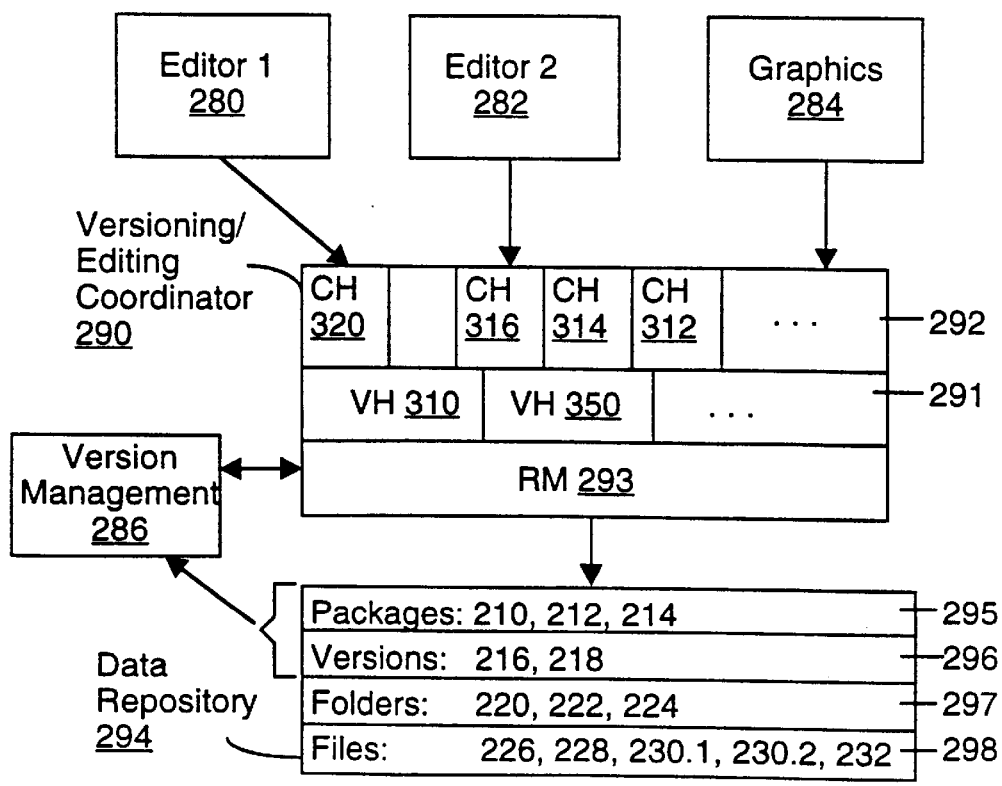
FIG. 4 is a block diagram showing how, in the present invention, editors communicate with the data repository and the versioning system of the present invention.

Referring to FIG. 4, there is shown a high level block diagram of the versioning/editing coordinator 290 of the present invention, which is coupled to the data repository 294, text editors 280, 282, a graphics editor 284 and a version management system 286. Please note that while only three editors 280, 282 and 284 are shown, the coordinator 290 could support any number and type of editors. However, any editors supported by the present versioning system would have to be adapted to communicate with an appropriate component handler 292 (the unit of the coordinator 290 that, among other things, forms the interface between an editor and a component being edited) as required by the coordinator 290. In other words, the coordinator 290 provides an open editing framework, but requires that any editor provide and receive certain essential information.

The data repository 294 represents in the secondary memory 116 or the primary memory 114 multiple versions of a complex system in accordance with the Vesta approach, described above. Consequently, the data repository 294 includes a system object 200 consisting of at least one package 210, 212, 214, each of which can exist in multiple immutable versions 216, 218. Each version includes at least one component, where a component can be a simple object, such as the files 226, 228, 230, 232 or a complex object such as folders 220, 222, 224, where a folder is a collection of other components, either folders or files. In the preferred embodiment of the present invention users of the editors 280, 282, 284 cannot directly edit or view components of the data repository 294. Rather, users of the editors 280, 282 and 284 can interact with the data repository 294 only through the versioning/editing coordinator 290, which integrates editing actions and versioning so as to eliminate the common configuration management problems set out above. The coordinator 290 also provides convenient user access to versioning commands and contextual information from within the editors. To this end, the coordinator 290 includes component handlers ("CH"), e.g., 312, 314, 316, 320, version handlers ("VH"). e.g., 310, 350, and a resource manager 293. Additional versioning support and some control of the versioning/editing coordinator 290 is provided by the version management system 286, which is coupled to both the coordinator 290 and the packages 295 and versions 296 of the data repository 294.

In the present invention, versioning is treated as two tasks: (1) version management, which is carried out by the version management system 286 and (2) versioning/editing coordination, which is carried out by the coordinator 290. While the focus of the present invention is on the versioning/editing coordination task, to understand the scope of the coordinator's responsibilities, it is necessary to understand the complimentary role of the version management system. Briefly, the version management system 286 keeps track of and organizes all versions in a package and implements versioning policy that determines when a new version can be created by the coordinator 290. As a result of the limited nature of this task, the version management system 286 knows nothing about the actual content of any of the versions and has nothing to do with the editing of components 297, 298, their sharing or creation.

Generally, the coordinator 290 queries the version management system 286 whenever it is called on to execute a versioning operation such as "checkout", "advance", "checkin" and "branch" on a particular package version 296. These versioning operations are described below. Briefly though, when a user issues a "checkout" command, the version manager 286 constructs a mutable/editable checkout branch from the package version being checked out; this is more a clerical than a versioning operation, which is why it is the concern of the version manager 286. In contrast, a user issues an "advance" command to create a new package version based on modifications made to an editable checkout package version; this is a true versioning operation that is performed by the editing/versioning coordinator 290. Based on the status/structure of the packages 295 and versions 296, and in light of the current versioning policy, the version management system 286 indicates to the coordinator 290 whether the versioning operation is allowable. For example, under the simple versioning policy implemented by the preferred embodiment, the version manager 286 would not grant the coordinator 290 permission to advance either a mainline package version or a checkout package version that is not on the leading edge of a checkout branch.

Once it has given its assent or denial to a versioning operation, the version management system 286 has no further involvement with the coordinator 290 and the data repository 294. One advantage of this structure, where the version management system 286 is separate from the versioning/editing coordinator 290, is that many different versioning policies can be implemented with little modification to the versioning/editing coordinator 290.

The resource manager 293 helps initialize interfaces between the editors 280–284 and the version and component handlers, coordinates the version handlers where necessary during the execution by the coordinator 290 of certain basic versioning/editing operations and encapsulates user preferences and tool configuration information (e.g., what kind of editor a user prefers). As for the handlers, these are complex objects that are at the heart of the present invention and whose behavior will be described in detail below. Briefly, though, each package version 296 in the data repository 294 that has a component 296, 297 that is being viewed or edited by a user is associated with one version handler 291. For example, referring to FIG. 5, if a user were editing version 216 of the package 212, the version 216 would have an associated version handler, say VH 310. Each version handler 291 coordinates all editing and bookkeeping changes affecting its associated package version 296. A version handler does not do this directly, but through messages sent to and received from a related, hierarchical set of component handlers 292, each of which is associated with one component 297, 298 in a chain of components running from a particular component being edited to the top-level component for that version.

Moreover, the editor being used to access a particular component 297, 298 can only do so by going through the component handler 292 associated with that particular component. This allows a component handler to monitor all editing changes to its associated component and inform the appropriate version handler 291 when those changes have versioning consequences. The version handler can then issue appropriate messages to the other component handlers for the same package version so that a new package version can be created by the version handler without any risk of the versioning failures of the prior art configuration management systems. For example, if a user has made changes to the component 232 using the editor 280 and wishes to make those changes permanent by advancing the package version 216, he could select "advance" from within the editor 280, and the component handler 320 would relay an advance message to the VH 310. Upon receiving an advance message, the VH 310 constructs a new version of the version being edited which incorporates any changes the user has made since the last advance and reuses any unchanged components from the previous package version. It does this by providing collaboration between editors and their handlers. This collaboration also allows the editors to display contextual information to users such as (1) the contextual name of the component is edited as new versions are created, (2) whether the current version is editable and (3) whether the current version is dirty. By providing this degree of cooperation between editors, component handlers and the version handlers associated with a single package version, versioning and package editing are integrated and require little or no user knowledge of and interaction with the versioning system.

As mentioned above, the present integrated versioning/editing system and method can support many different types of editors. This requires that the component handlers be able to share information and messages with the many different kinds of editors that might be employed in any particular environment. This could be accomplished in two ways. First, all editors could be modified to support a single component handler messaging protocol. This is not a practical approach as it would require substantial modifications to the editors in each environment incorporating the present invention. Alternatively, different types of component handlers could be provided with distinct editor interfaces based on the particular editor used to modify the component handler's associated component. Different component handler types would still share the same kind of information with their associated editors; the only difference in the component handler/editor interfaces being in the technologies (e.g., procedure calls, object messaging, etc) used for communications between a component handler and its associated editor. For example, if the editors 280 and 282 were EMACS and vi, respectively, the component handlers 320 and 316 associated with components being edited using those editors would incorporate EMACS and vi interfaces, respectively. Additionally, the editors 280, 282 could be folder editors for editing the contents (e.g., deleting files or other folders, copying, etc.) of the various folders 220, 222, 224. This latter approach to the editor/component handler interface is that adopted by the preferred embodiment.

Which kind of component handler 292 to create for each component when needed is determined by the resource manager 293 based on configuration information and user preferences. For example, the resource manager 293 determines what kind of editor is needed to edit a component and, based on that, returns an appropriate component handler 292 to the version handler 291. The details of how this is done are outside the scope of the present invention.

Figure 1:
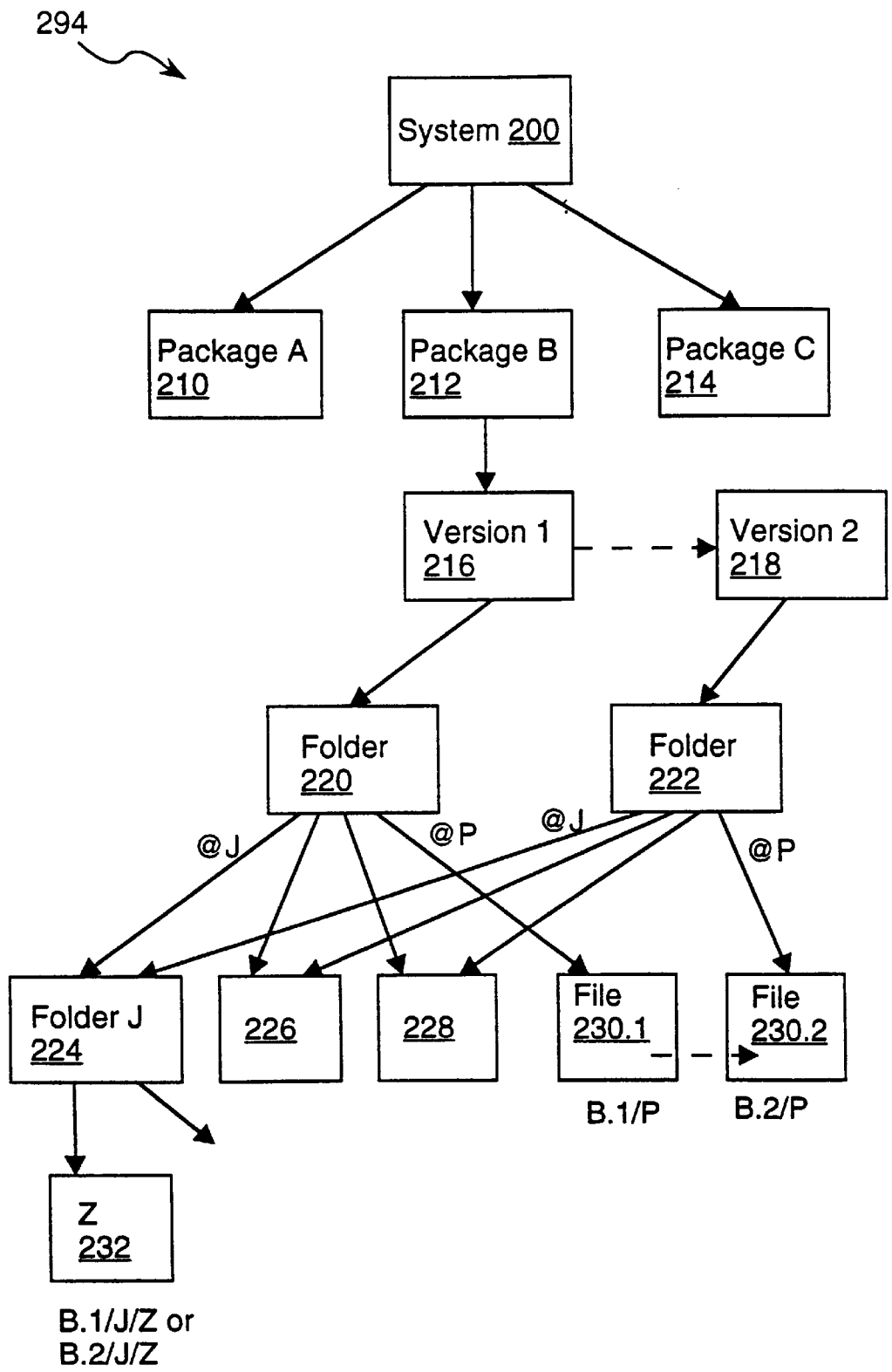
FIG. 1 shows the structure of the data repository common to both the prior art Vesta system and the present versioning system.
Figure 2:
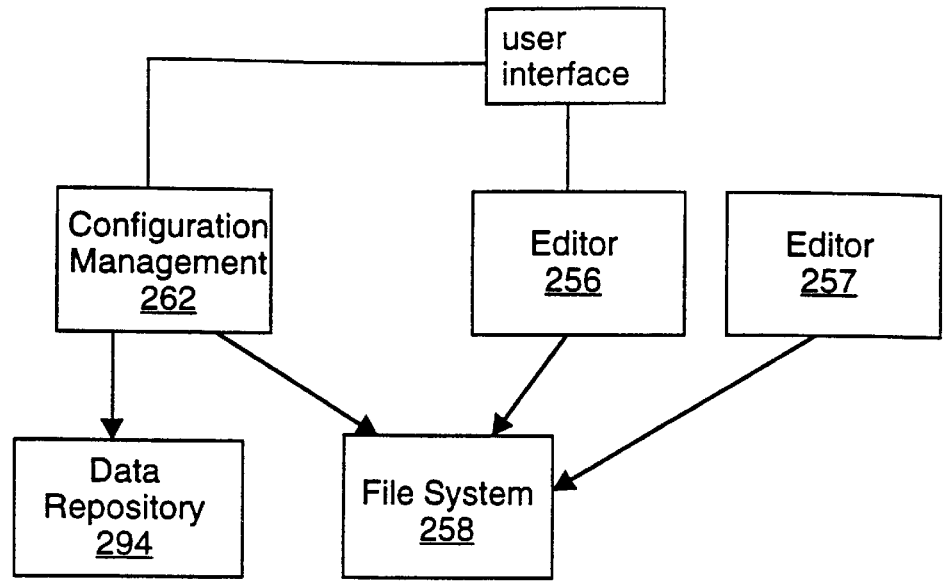
FIG. 2 is a block diagram showing how, in the prior art, editors communicate with the data repository and a prior art configuration management system.
Figure 5:
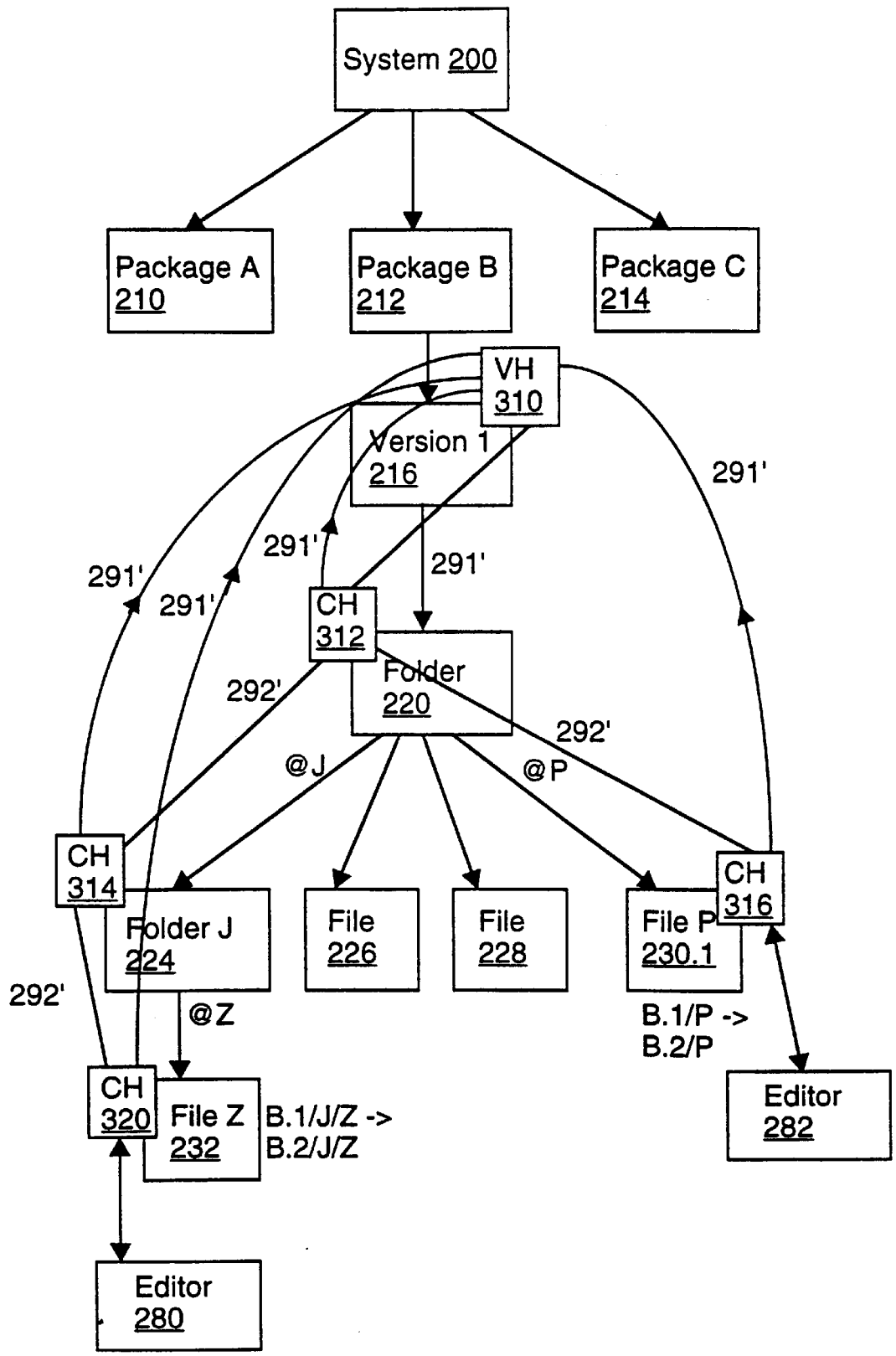
FIG. 5 is a data structure-oriented diagram illustrating an initial state of the data repository and the versioning system of the present invention before a user begins editing.

1. Coordinator 290 Architecture:

Referring to FIG. 5, there is shown a structural diagram that illustrates the relationships between the various elements of the coordinator 290 and the data repository 294 for the situation where a user has opened for editing two leaf objects, the files 232 ("B.1/J/Z") and 230.1 ("B.1/P"), in the context of the first version 216 of package 212. The data repository shown in FIG. 5 is similar to the one shown in FIG. 1.

Elements of the coordinator 290 shown in FIG. 5 include a version handler 310 and component handlers 312, 314, 316 and 320, each of which is associated with one of the components of the data repository 294. As set out above, there is one version handler associated with each version in which some component is opened for editing. Thus, the version handler 310 is associated with the version 216. Moreover, there is one component handler associated with each component in an "editing chain", where an editing chain includes a component being edited (where editing can also mean viewing), the top level component of the version being edited, and all of the components in a direct line between those two components. Component handlers are not provided for components that are not part of an editing chain. Consequently, the component handlers 312, 314, 316 and 320 are associated respectively with the components 220, 224, 230.1 and 232, and no component handlers are associated with the files 226 and 228.

These component handlers form a hierarchical network, where an intermediate-level component handler, e.g., the CH 314, relays messages from the version handler or a higher-level component handler, e.g., the CH 312, to all or some of its subcomponent handlers, or "subhandlers" (which term refers to component handlers that are associated with the higher-level component's subcomponents), e.g, the CH 320, depending on the particular message. Consistent with this kind of communications scheme, each version handler and component handler knows the identity of each of its subhandlers. In the preferred embodiment, it is not necessary for a component handler to know the identity of component handlers that are not its subhandlers; however, as is shown in FIG. 5, each component handler does have a communications link to its associated version handler and can return values to any component handler that sends it a message requiring a response. In the interest of clarity, the direct component handler/version links are not shown in FIGS. 7 and 8, although they are present in the situations illustrated by those figures.

2. Abstract Interfaces of the Component Handler and Version Handler

In the preferred embodiment, each component handler and version handler is implemented as an instance of a component handler or version handler object, respectively. Each of these objects encapsulates a set of procedures and abstract interfaces that define the actions that are proprietary to each particular object and the messages used by that type of object. These abstract interfaces provide the framework that allows total coordination between the version handler and its constituent component handlers so they can perform versioning without any assistance from users of the data repository. Table 1 lists and briefly describes the version handler messages defined by the abstract interface model of a version handler object. The use of these messages is described in subsequent sections, which set out how various basic editing/versioning operations are implemented in the present invention. As shown in FIG. 5, the version handler is an intermediary between the component handlers and resource manager, thus some of the messages of Table 2 (shown on FIG. 5 with the reference number 291') are from the component handlers associated with the version handler and others are from the resource manager.

TABLE 1 get_version_name

A message that returns the current package version name.

is_immutable

This indicates whether the current version associated with the version handler is editable. If true, the current version cannot be advanced. This information is provided to the version handler by the version management system 286.

set_version_dirty

This message is sent to the version handler by the first of its constituent component handlers having a changed, or "dirty", editing buffer, causing all constituent component handlers and editors to be notified.

is_dirty

This returns true when the user has made any change in any editor associated with the package version being edited.

get_verCommands

A message from one of its component handlers associated with an editor that asks the version handler to return to the calling component handler a list of commands that the user might invoke for versioning. The set of versioning commands returned by the version handler depends on versioning policy and the status of the current version.

lookup (path)

A message from the resource manager which asks the version handler to get a component handler for the subcomponent named by "path", creating it and others as necessary. The lookup operation is iterative. Thus, the version handler responds to this message by creating a subhandler for one its subcomponents named in the path if necessary, then issuing the lookup message to that subhandler, which performs the same operations. A handler returns a nil value when the named subcomponent is not in the version.

Table 2 lists all of the component handler messages defined by the component handler abstract interface. Generally, a component handler receives messages from its parent component handler and passes the messages along to its children component handlers, or subhandlers. Using this scheme, many of these commands are recursively executed by the various levels of component handlers within the coordinator 290. The messages of Table 2 are shown as the messages 292' on FIG. 5.

TABLE 2 notify_full_name (String)

A message from a component handler's parent notifying the receiving handler of its name, which is passed via the "String" argument. This message is necessary because the name of a handler can change during editing; e.g., as a result of versioning commands such as advance, revert, checkout and checkin. After processing the notify_full_name command, for each of its subhandlers, the component handler updates "String" and issues to them an updated notify_full_name message.

notify_version_immutable

A message from a component handler's parent notifying the receiving handler whether or not a user should be allowed to modify its buffer. The handler relays the notification to its subhandlers.

notify_version_dirty

A message from a component handler's parent notifying the receiving handler that the version with which it is associated is dirty; i.e., that a component of its associated version has been modified. The handler relays the notification to its subhandlers.

get_edit_command

A command issued by a handler's parent that asks the handler to produce a command that, when executed, invokes editing on the contents of the handler's associated component.

advance

A command issued by a handler's parent that asks the handler to return a component representing the current value of the handler's associated component and, by implication, all subcomponents. The unchanged subcomponents are shared between the new component and the current version of the same component. After processing the message, the handler returns the address of its new component, or, if its component and all of its subcomponents are clean, the address of its current component. If the handler is not a root level handler, the handler cannot complete its own advance operation until the advance message has been iteratively processed by its subhandlers.

revert

A command issue by a handler's parent that tells the handler to restore its editing state (i.e., its buffer) to that of the last advance.

lookup (path)

A command issued by a handler's parent (either the version handler or a component handler) that tells the handler to get a handler for the subcomponent named by "path". In response, the handler creates the subhandler or others if necessary.

quit

A command issued to a handler that causes the handler to unconditionally and recursively terminate all editing of the component and its subcomponents. This message is issued by the handler's parent shortly before deleting the handler.

get_version Handler

A command that when executed by a handler returns a pointer to its associated version handler.

2. Editor-Component Handler Interfaces:

As mentioned above, component handlers can act as intermediaries between editors and their associated components. Each component handler and its associated editor share a private interface that is specific to the editor type. In contrast, the abstract interfaces provided by the component handlers and version handlers are open, which allows free communications between handlers using the messages provided by the abstract interfaces. The fact that the editor-component handler interface is private and freely customizable allows virtually any type of editor, using any communications protocol, to be integrated with the versioning/editing coordinator 290. For example, to make their new editor compatible with the coordinator 290, all a vendor needs to do is define an object type for a component handler that includes (inherits) the abstract interface for communicating with other handlers and an editor interface that is specific to the new editor. The only requirements imposed on the component handler-editor interface go to the type of information that must be provided by the interface and the manner in which editing is performed.

Thus, a CH 292 does not allow a user to directly edit an immutable component such as the file 232. Rather, the CH 292 creates a temporary copy of the component 297, 298, or gives the editor temporary read access to the component 297, 298, which the editor then reads and loads into an editing buffer, which is where actual editing or viewing of components take place. These alternative embodiments are shown in FIGS. 6A and 6B, respectively.

Figure 6A:
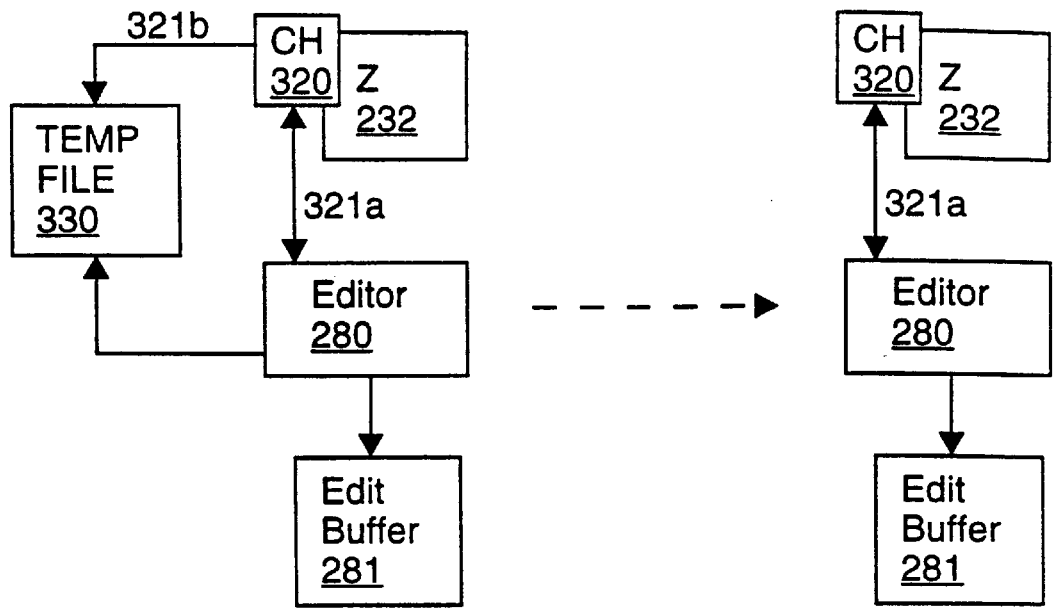
FIG. 6A is a block diagram of a first preferred embodiment of an editor/component handler interface.

Referring to FIG. 6A, there are shown two block diagrams illustrating connections between an editor 280, a component 232 to be edited by the editor, a component handler 320 associated with that component, a temporary file 330 and an editing buffer 281 while a component is being opened for editing and immediately after that component has been read into the editing buffer. In the left most block diagram, a user has told the coordinator 290 that he wishes to view or edit the component 232. As a result, the coordinator 290 recursively locates, or looks up, the component 232 (in a process described below), and then executes a command that causes the editor 280 to be invoked on the contents of the component 232. This command causes the CH 320 to create the temporary file 330, copy the contents of the component 232 to the temporary file 330, and then pass the address of the temporary file 330 to the editor. Subsequently, the editor creates the editing buffer 281, reads the contents of the temporary file 330 into the buffer 281, and then notifies the component handler 320 that the temporary file 330 has been read. This takes us to the right most block diagram of FIG. 6A, where the CH 320 has deleted the temporary file 330, leaving the editor 280 free to edit or view the copy of the component 232 maintained in the editing buffer 281.

Figure 6B:
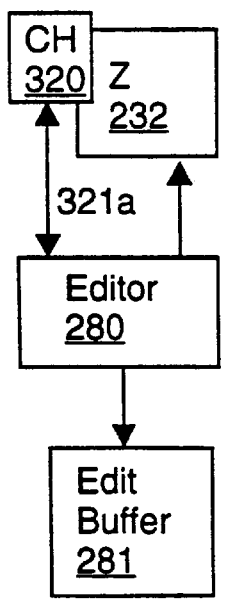
FIG. 6B is a block diagram of a second preferred embodiment of an editor/component handler interface.

Referring to FIG. 6B, there is shown the second alternative embodiment of an editor/component handler interface. In this alternative embodiment the data repository 294 is stored as a database, where each of the components 297, 298 is read-only. In this alternative embodiment, when the user tells the coordinator 290 that he wishes to edit the component 232, the CH 320 passes the editor 280 the data base identifier of that component's record, which allows the editor 280 to read the component 232 into its editing buffer 281 for viewing or editing. Once the component has been read into the editing buffer 281, the user can either view and edit the component's buffer, or just view it, depending on whether the version handler has granted permission to edit. As in the embodiment of FIG. 6A, the version handler determines whether to grant permission based on interactions with the version manager 286, which sets versioning policy.

Once the component has been read into the editing buffer 281 according to either of the two aforementioned alternative embodiments, the CH 320 only gets involved with the editor 280 in situations that have versioning consequences or pertain to issues about which the editor 280 has no knowledge. For example, if the editor 280 wishes to make persistent changes to the editing buffer 281, that fact is passed by the CH 320 to the VH 310. Also if the CH 320 receives various versioning messages through its chain of component handlers, the CH 320 passes those messages (according to the editor's messaging protocol) to the editor 280. These messages include ones that tell the editor 280 to return the contents of its edited buffer, that another component 292 has been edited, and that the name of a component it is editing has been changed due to the creation of a new package version. Other messages allow the editor 282 to request a list of available versioning commands from the version handler, so that it can display those commands in one way or another to the user. These messages are described in depth below.

B. Coordinator 290 Method of Operation

Having set out details of the various functional blocks of the versioning 290 system and their interrelationship with the data repository 294 and the editors 280, 282, 284, for purposes of illustration, some typical operations of the coordinator 290 will now be described:

1. How the coordinator 290 handles user requests to view or edit a component;

2. How the coordinator 290 creates a new package version that is identical to an existing package version;

3. How the coordinator 290 handles user requests to view or edit a component of an immutable package version that is shared by an advanceable package version;

4. How the coordinator 290 handles the situation where a user begins to edit a component (either a folder or a file) of an advanceable version;

5. How the coordinator 290 creates a new package version when the user advances an advanceable version;

6. How the coordinator 290 handles a user request to return a version being edited to its initial state (e.g., how the user undoes changes to the editing buffers before an advance is performed); and 7. How the coordinator 290 handles checkout and checkin commands.

1. How the coordinator 290 handles user requests to view or edit a component:

As set out above, when the user wishes to access a particular component of the data repository 294 he must inform the coordinator 290 of the name and context of that component. In the preferred embodiment of the present invention, the user relays this request to the coordinator 290 through a user interface (not shown) which, in the preferred embodiment, is coupled to the resource manager 293. For example, in reference to FIG. 5, if the user wishes to view File Z from version 1 216 he would, through the user interface, ask the resource manager 293 to open "B.1 /J/Z".

In response to this request the resource manager 293 first determines if a version manager is open for version 1 of package B. If one is not open, the resource manager 293 creates one, e.g., VH 310, associates it with version 1 216, as shown in FIG. 5, and then relays the user's request to the version handler as a "lookup" command, in which the version handler 310 is asked to initiate the recursive lookup of a particular component of the data repository 294, in this case the file "B.1/J/Z", for user access. Alternatively, If the VH 310 already exists, the resource manager 293 passes control of the lookup request to the existing version handler 310. In either case, the version handler 310 responds in the same way to the lookup message.

A version handler 291 responds to a lookup message by first determining whether there is a component handler 292 associated with its top-level folder, and, if one is not present, creating such a component handler 292. The version handler 291 then strips the versioning information from the contextual file name (in the example above, "B.1") and passes a modified lookup message to the top level component handler 292 asking it to recursively lookup the component 297, 298 identified by the remainder of the contextual component name (in the example above, "J/Z"). This name could refer to a file 298 or a folder 297. The top-level component handler 292 processes this lookup command as would any other component handler, which process is described below.

Which kind of component handler 292 to create for each component when needed is determined by the resource manager 293 based on configuration information and user preferences. For example, the resource manager 293 determines what kind of editor is needed to edit a component and, based on that, returns an appropriate component handler 292 to the version handler 291. The details of how this is done are outside the scope of the present invention.

A component handler 292 responds differently to a lookup command depending on whether the lookup message specified a non-null as opposed to a null component name. When a component handler 292 receives a lookup message with a non-null component name, that indicates to the component handler 292 that the user wants to edit some component other than one associated with itself. In this situation, a component handler 292 first determines whether it has a subcomponent 297, 298 corresponding to the first part of the name of the component 297, 298 being looked-up (in the example above, the top level component handler would be looking for a folder "J"). If not, the component handler 292 returns a value of "nil", which is recursively returned up the chain of component handlers 292 to the version handler 291 and then to the resource manager 293, indicating that the named component does not exist. If there is such a subcomponent, and there is no subhandler associated with that subcomponent, the component handler 292 creates one; otherwise, it uses the existing component handler associated with that subcomponent. The component handler 292 then strips the first part of the component name it received and passes the remainder as part of another lookup message to the subhandler, which continues the recursive lookup process. On the other hand, when a component handler receives a null component name in a lookup message, that indicates to the component handler that the user wishes to invoke editing on the contents of its associated component. Thus, in this situation, the component handler returns its own address, which is relayed through the chain of component handlers to the version handler and, ultimately, the resource manager 293, which causes editing to be invoked on the contents of the component handler's associated component.

This process of invoking an editor 280, 282, etc. on a file 298 or a folder 297 is now briefly described. When a version handler 291 receives a valid component handler address following the execution of a lookup command, it issues a "get_editor" command to the component handler 292 whose address it just received. This component handler 292 then returns to the version handler 291 a command that, when executed, causes editing to be initiated on the contents of that component handler's associated component (either a file or a folder) according to one of the two preferred file sharing procedures discussed in reference to FIGS. 6A and 6B. This command is then executed by the resource manager 293.

Thus, in the preceding example, upon receiving the lookup command "lookup B.1/J/Z", the VH 310 determines whether an open component handler is associated with the root, or top-level, component 220 of the package version 216, of which B.1/J/Z is a member. If such a component handler does not exist, the VH 310 creates the component handler, e.g, CH 312, associates it with the top-level component 216 and establishes a two-way connection between itself and the new CH 312. Alternatively, if the CH 312 were already in existence before the user issued the lookup command, the VH 310 would simply use the preexisting CH 312. Moreover, in the preferred embodiment, because the component 220 is a folder, the CH 312 is a special type of component handler with folder-specific interfaces.

Next, the VH 310 strips the version information from the file name (e.g., "B.1"), leaving a remainder of "J/Z", and relays the recursive lookup command ("lookup J/Z") to the top-level component handler 312, which evaluates the first part of the component name "J/Z". Because the first part of that name, "J", corresponds to the folder J 224, which is a subcomponent of the top level folder 220, the CH 312 creates a subhandler CH 314 associated with the folder 224, or uses an existing CH 314. The top-level CH 312 then strips away the part of the object name that corresponds to the subcomponent of the top-level object identified by the user (e.g., "J", which corresponds to folder J 224) and passes the remainder of the name (e.g., "Z") to the subhandler CH 314 as part of another recursive lookup command, "lookup Z". As befits a recursive process, the CH 314 handles that lookup message in the same manner as did the top-level CH 312. Consequently, the CH 314 creates a new CH 320 associated with the file 232, strips the "Z" from the file name, and passes the lookup message, "lookup_" (where "_" indicates a null argument) to the CH 320. Because that lookup message has a null argument, the CH 320 returns its own address up the chain of component handlers (i.e., CH 320 to CH 314 to CH 312) back to the version handler 310, which then issues a "get_editor" command back to the same component handler 310. In response to the get_editor command, that CH 320 returns to the version handler 310 the appropriate editing command that, when executed by the resource manager 293, results in editing being invoked on the contents of the File 232 by the editor 280 according to one of the methods described in reference to FIGS. 6A and 6B. However, if an editor has already been opened on that component, that editor would be used instead of a new editor.

Once editing has been invoked on the contents of a component, the user can either view and edit the component's buffer, or just view it, depending on whether the component is being viewed in the context of a version that could be advanced. This information is provided by the version handler via a notify_version_immutable message sent recursively to all of its component handlers whenever there are context changes, which could occur anytime in an editing session due to versioning events. This message has a single boolean argument, which can either be set to TRUE to indicate that the version and all of its components may not be edited, or FALSE to indicate the complementary condition. When creating a new editor, the creating component handler is not notified, but sets editing permission for the editor by checking the is_immutable message.

Thus, as the result of the lookup process described above, the coordinator 290 creates as needed a chain of component handlers between the object identified by the user "B.1/J/Z" and the version handler VH 310 including that object, and establishes an editing interface between an editor 280 and the component handler 320 associated with the component to be edited 232.

Figure 7:
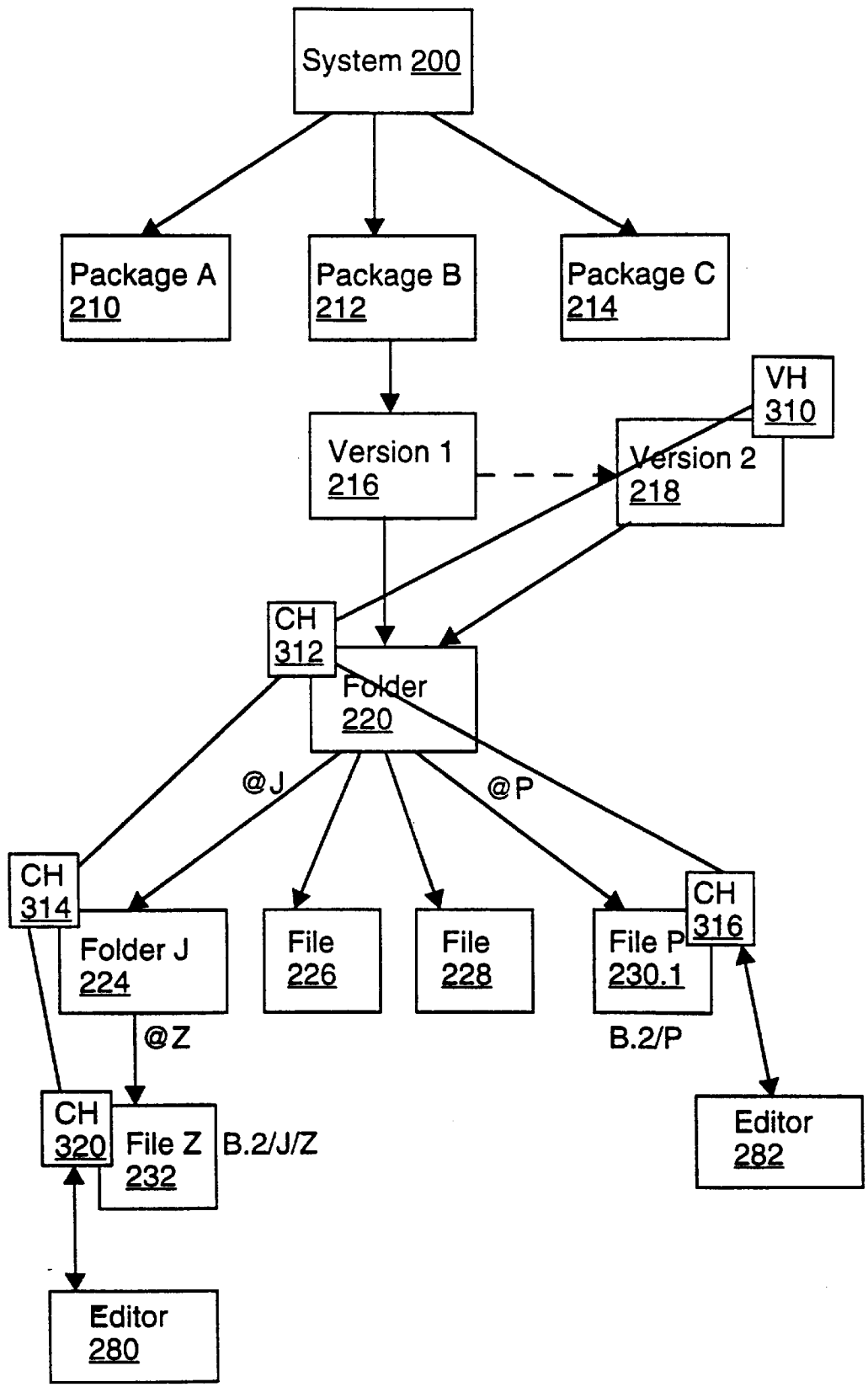
FIG. 7 is a data structure-oriented diagram illustrating the status of the data repository and the versioning system of the present invention for the case where a user creates a new package version that is identical to an existing package version.

2. How the coordinator 290 creates a new package version that is identical to an existing package version:

Referring to FIG. 7, there is shown the state of the data repository 294 and the coordinator 290 after a user has asked to save, or "advance" the package B 212, by which is meant that the user wants the versioning system to create a new version 218 of the package 212 that incorporates all editing changes to the previous version 216 of the same package. In a typical versioning policy, an advance can only be performed in a checkout branch. In the particular situation illustrated in FIG. 7, the user has asked for this advance after "visiting" (i.e., viewing with the editors 280 and 282, respectively) the two files 232 and 230.1 but making no editing changes to their corresponding file buffers. Consequently, the second version 218 is identical to the first version 216.

All of the elements of FIG. 7 have already been described above in reference to FIG. 5. However, completion of this advance operation results in two significant differences from the situation of FIG. 5. First, after the completion of this advance operation, all of the components are shared by both package versions 216 and 218, which is illustrated by the fact that the top-level folder 220 is shared by both version 1 216 and version 2 218. Second, the version handler 310 is no longer associated with the first version 216 of the package 212, but the second version 218. This in turn means that all of the component handlers 312, 314, 316, 320 are also associated with the second version 218 of the package 212. Of course, none of these changes affect the underlying components 232, 224, 220, 230.1, etc., which are immutable. However, these changes do affect the context in which each of these components and particularly the components opened for editing (i.e., the components with corresponding editing buffers) are viewed by the user using one of the editors 280, 282. This is because each component being edited and all components between that edited component and its top-level folder are only viewed in the context of their associated component handlers and version handler. This explains why, in FIG. 5, the contextual name of the file 232 has been changed from B.1/J/Z to B.2/J/Z, signifying it is being viewed in the context of version 2 218 and its associated version handler 310. Similarly the contextual name of the file 230.1 has been changed from B.1/P to B.2/P. As described above, context changes can also occur as a result of checkout and checkin operations.

This context change is automatically implemented by the version handler associated with the advancing version whenever a new package version is created, which reflects a primary tenet of the versioning model of the present model invention. This is that all progress in the development of a package must occur, by default, only from the leading edge version of the package. The corollary to this versioning rule is that only components viewed in the leading edge version of a package can be edited (there is one exception, which is described below). Thus, when the user causes a new package version to be created, so that the user can continue to create subsequent new package versions, the version handler rolls forward all of the component handlers from the preexisting version to the new leading edge version. The steps by which this result obtains in the coordinator 290 is now described, starting from the point the user has visited, or opened, the files 232 and 230.1 and before they have tried to save, or advance the package version 216.

When the user wishes to advance a package version 296, he must do so by issuing from the editor 280, 282 an advance (or save) command, which the component handler 292 associated with the component being edited receives and relays to the version handler 291 associated with the version 296 being edited. The version handler 291 then recursively issues the advance command to its component handlers 292. Due to the fact that in the present invention the editors 280, 282 know nothing about versioning and versioning commands, the only way they can supply these versioning commands to the user is to receive them first from the version handler 291 via the chain of component handlers 292 associated with the component being edited. The editor 280, 282 then displays the commands to the user without any idea of what it is displaying. Alternative preferred embodiments of the present invention execute this process in one of two ways.

In the first alternative preferred embodiment, the editor 280 displays a selector for a versioning menu someplace in the editing window (note: each editor can have multiple editing windows, each displaying the contents of one editing buffer). When the user selects the versioning menu through the selector, the component handler 292 associated with the active editing window sends a "get_verCommands" message to the version handler 291, which responds by sending a return message to that component handler 292 listing all versioning commands appropriate to the current editing context. For example, if the user were editing the leading edge version, then the list of versioning commands would include advance, or save. But, if the user were viewing a back version, the versioning commands would not include "advance".

In the second alternative preferred embodiment, the editor 280 continually displays a versioning bar someplace in the editing window showing a fixed set of versioning commands. For example, this list would include both checkout and advance, even though they might not both be available in a particular editing context. To show the user which commands are available and which are not, temporarily unavailable commands are displayed in a grayed out typeface, whereas available versioning commands are displayed in a high contrast typeface. Because the versioning commands are always displayed, their availability status must be updated dynamically as the context of any particular file being edited is changed. For example, if an unadvanceable version is checked out, it then becomes advanceable (meaning its component can be edited and saved, resulting in the creation of a new version), which requires an immediate change in the display of the versioning bar. Thus, anytime an operation with versioning consequences is recognized by a CH 292, it issues the aforementioned get_verCommands message directly to its version handler 291, which then can return the list of currently available versioning commands directly to the CH 292.

If the version handler calls "advance" on its top-level component handler, which then returns the same value it had previous to the advance (indicating that no changes were made), the version handler 291 simply creates a new version, rolls itself forward to the new version (i.e., the version handler changes its association from the old version to the new version) and issues a "notify_full_name" message to the top level component handler, which then propagates this message throughout the tree of component handlers 292 associated with the old version. This command essentially rolls forward each of the component handlers 292 to the new version context by renaming the component handlers, which then issue corresponding messages to their associated editors causing the editors to rename the editing buffers to show that the new editing context. After creating the new version, the version handler resets the is_dirty boolean and issues the recursive notify_version_dirty (FALSE) message to its top-level component handler.

Thus, in the present example illustrated in FIG. 7, where the user has called advance (i.e., nothing was edited before the advance), the version handler 310 creates a second version 218 and rolls itself forward to that second version 218. The version handler 310 then notifies the top level folder handler 312 to change its contextual name from B.1 to B.2, reflecting the fact that it is now associated with version 2 218 of package B 212. The top level folder handler 312 then sends the notify_full_name message to its subhandlers 314 and 316, telling them to change their names to B.2/J and B.2/P, respectively. Because the component handler 316 was associated with the leaf object 230.1, which was being edited in the editor 282, the CH 316 also notifies the editor 282 to change the name of its editing buffer to B.2/P so as to inform the user of the context change. Finally, the component handler 314 notifies its subhandler 320 to change its name to B.2/J/Z, after which the CH 320 notifies to accordingly change the name of its editing buffer to B.2/J/Z.

The situation where an advance occurs in a version where there have been changes since the last advance are described below in section 5.

3. How the coordinator 290 handles user requests to view or edit a component of an immutable package version that is shared by an advanceable package version:

Having described how a user advances a package version (e.g, the version 216) by creating an identical version (e.g, the version 218), we will now describe how the user views one of the components shared by both versions from the context of the back version. This situation is illustrated by FIG. 8, which shows the state of the data repository 294, coordinator 290 and the editors 280, 281 and 282 after a user has visited the component 232 with the newly opened editor 281 in the context of the back version 216 of package B 212, the user having previously advanced the package B to a second version 218.

The present invention allows a user to view, but not edit, any component 297, 298 of a back package version maintained in the data repository 294. To do this, the coordinator 290 needs to create a new version handler 291 and chain of component handlers 292 corresponding to the back version and the particular chain of components 297, 298 the user wishes to view. This is because, in an advance, the version and component handlers always roll forward to stay on the leading edge of package development. Additionally, even though, as in the examples in FIGS. 5 and 7, the two versions 296 might share the same components 297, 298, a component handler 292 associated with the leading edge version 296a cannot be associated with a component being viewed in the context of the back version 296b; otherwise the contexts would become confused.

Figure 8:
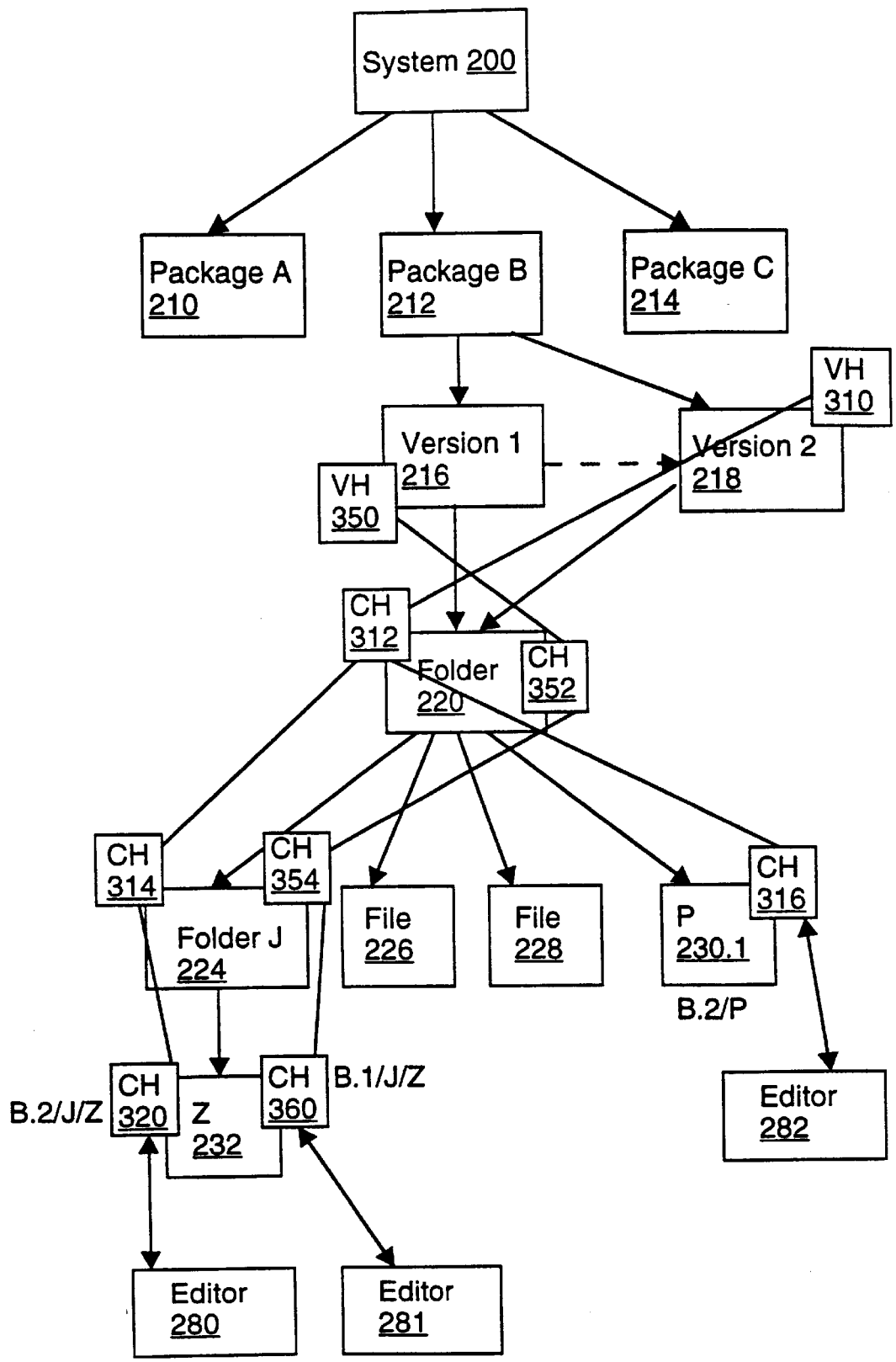
FIG. 8 is a data structure-oriented diagram illustrating the status of the data repository and versioning system of the present invention for the case where a user views a component common to the leading edge version and a back version from the context of the back version.

Consequently, in the example illustrated in FIG. 8, when the user asks the coordinator 290 to lookup the component "B.1/J/Z" the coordinator 290 executes that lookup command in exactly the same manner as when the user asked to view the same component when it was the leading edge version. Consequently, once the lookup command is completed, the coordinator 290 has created a new version handler 350 with a set of component handlers CH 360, CH 354 and CH 352 associated respectively with the file 232 and the folders 224 and 220. Even though these component handlers are associated with the same components as the CHs 320, 314 and 312, they are completely independent from those. This follows from the fact that the top-level component handler 352 is associated with the version handler 350, whereas the top-level component handler 312 is associated with the version handler 310. This allows the coordinator 290 to treat the same source file 232 differently depending on the context in which it is being viewed.

For example, when the resource manager 293 creates the version handler 350 associated with the back version 216, it checks with the version handler to see whether the "is_ immutable" message is true; meaning that it cannot be advanced. Subsequently, every one of the new component handlers 352, 354, 356, 360 created in the course of executing the lookup command is aware (by default) that "is_immutable" is true. As a result, the component handler 360 will instruct the editor 281 to not let the user make changes to the editor buffer corresponding to the file context "B.1/J/Z". This is because that component is part of an immutable back version 216. However, if the same user were to switch to a second editing window 280 displaying the buffer corresponding to the file context "B.2/J/Z", the component handler 320 would allow changes in that buffer to be made. This is because that context is a part of the mutable version 218. These different contexts are clearly displayed to users via the different versioning commands displayed in the respective editing windows corresponding to the buffers for the file B.1/J/Z and B.2/J/Z. That is, the version handler 350 would not include an advance (save) command in its list of version commands returned to the component handler 360, whereas the version handler 310 would return such a command to the component handler 320.

4. How the coordinator 290 handles the situation where a user begins to edit a component (either a folder or a file) of an advanceable version:

Whenever a package version is advanced, the global "is_dirty" boolean for the new package version that indicates whether or not editing changes have been made to a package version, is set to no, indicating that the version is clean. The is_dirty boolean is set by the version handler upon receiving a "set_version_dirty" message from the first associated component handler with editing changes (e.g, any keystroke) in its corresponding buffer since the previous advance. Upon receiving the set_version_dirty message, the version handler 291 sends a "notify_version_dirty(TRUE)" message to its top-level component handler, which recursively propagates the notify_version_dirty (TRUE) message to all of the component handlers 291 in that version. This message tells all of the version handler's component handlers that the previously clean version is now dirty, which fact each component handler relays to its associated editor to be communicated to the user in some perceptible way (e.g., by changing the appearance of the file buffer's displayed name). After receiving this notify_version_dirty(TRUE) message, and until the version is somehow made clean, which fact is communicated to them via a notify_version_dirty(FALSE) message sent by the version handler, none of the other component handlers will report editing changes in their associated buffers to the version handler.

The is_dirty boolean does not play a major role in versioning, the only exception being that in the versioning policy of the preferred embodiment, a dirty version may not be checked in until it is advanced/cleaned up (although a policy can be envisioned where a dirty version is automatically advanced before being checked in). Instead, the major use of the is_dirty boolean is to provide users with contextual versioning information in the editors.

5. How the coordinator 290 creates a new package version when the user advances an advanceable version:

We have already discussed in reference to FIG. 5 the situation where the user initiates an advance by saving a version when no editing changes have been made to any of the version's component. However, when at least one of the version's components has been edited, and the user initiates an advance, the coordinator 290 must create a new version of the package including new components that represent the currently edited versions of all components that differ from the corresponding components of the previous version. So as to maintain as compact a data repository as possible, unchanged components are shared between versions.

As with most other operations executed by the coordinator 290, the advance operation is performed recursively, and is triggered when the user selects the advance command from the versioning menu displayed in an editing window opened on a component of the leading edge version. This command is directly relayed to the version handler for the leading edge version, which then relays the advance command to its top level component handler, which acts on the message and passes it on to its subhandlers, which pattern is repeated all the way down to the leaf level component handlers. Each of these component handlers respond in the same manner.

Generally, in response to an advance command sent by a higher-level handler (either a version handler or a component handler), a component handler creates a new component that represents the currently edited value of its associated component (i.e., the state of the component's editing buffer) only when actual editing changes were made to that component. Where the component is a folder that is not actually being edited but has a subcomponent that is being edited, any changes to the subcomponent constitute changes to the folder that includes the component. I.e., a change to a component requires the coordinator 290 to create a new chain of components from the actual edited component to the new version. More specifically, upon receiving an advance message, if changes to its associated component were made in its editing buffer since the last advance, a component handler creates a new component from the contents of its editing buffer, associates itself with the new component and returns the address of the new component to higher-level handler (either a version handler or a component handler) that issued the advance message. That higher-level handler, since the contents of its component were changed when the new subcomponent was created, then creates a new higher level component, associates itself with that higher level component and again, returns the address of the new higher-level component upward. This process is repeated until a new top-level component is created, whose address the top level handler returns to the version handler. On the other hand, if no changes were made in its editing buffer, the component handler simply returns the address of its associated component.

Figure 9:
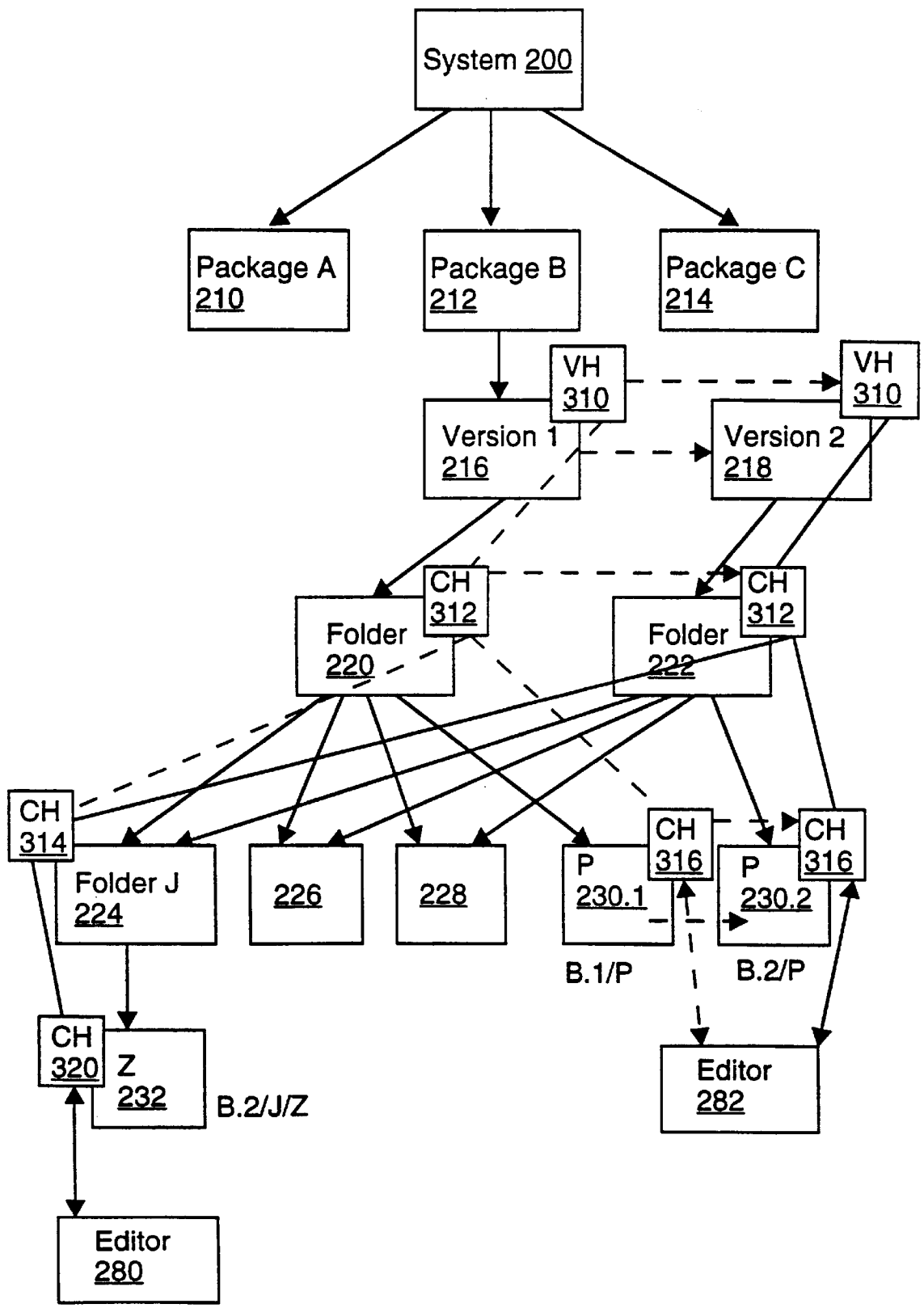
FIG. 9 is a data structure-oriented diagram illustrating the status of the data repository and versioning system of the present invention for the case where a user makes an editing change in a component of the leading edge version.

For example, see FIG. 9, which shows the state of the data repository 294 following an advance initiated by the user after making editing changes to the buffer in the editor 282 but no other components of the data repository. Most of the elements of this figure have been described previously in reference to FIGS. 5 and 7. The only new elements are the new top-level folder 222 associated with the top-level component handler 312 and the new file 230.2 associated with the leaf-level component handler 316.

To arrive at the final state shown in FIG. 9 from the initial state corresponding to FIG. 5, the user first issues an advance command from the editor 282 to the version handler 310 via the component handler 316. The same results would also be obtained if the user issued an advance command from any editor associated with any component of the version 216. The version handler 310 then passes the advance command to the top-level folder handler 312, which acts on the command recursively by passing it on to its subhandlers 314 and 316. Because it too has an open subhandler 320, the CH 314 cannot complete the advance command without checking with the CH 320, to which it relays the advance message. As no changes had been made on the contents of its associated file 232 since the last advance, the CH 320 returns the address of its component 232 to the CH 314, which, noting no change in status, returns the address of its associated component, the folder 224 to the top-level component handler 312, which still cannot complete the advance command without receiving a response from the subhandler 316.

In response to the advance command, the subhandler 316 creates a new component 230.2 reflecting editing changes to the contents of the editor buffer 282 and associates itself with the new component 230.2 to stay on the leading edge of package development. The CH 316 then returns the address of the component 230.2 to the CH 312, which, noting the change in address of its file "P", creates a new folder 222 including the new component 230.2 and all of the unchanged components 224, 226 and 228. The component handler 312 then rolls forward to the new folder 222 and passes the address of the new folder 222 to the version handler 310, which in response creates a new version 218 that includes the new top-level folder 222. To complete the advance operation, the version handler 310 rolls forward to the new version 218, and initiates the recursive notify_full_name message, which results in the renaming of all of the component handlers 312, 314, 316 and 320 to reflect their new context (i.e., that they are now associated with version 2, not version 1). After completing the advance, the version handler resets the is_dirty boolean and sends a recursive notify_version_dirty (FALSE) message to all of the component handlers 312, 314, 316, 320 indicating that the new version is clean.

As a result of this advance operation, a second version 218 of package B is created including new components for all components that were edited and sharing unchanged components with the first version 216. All of this occurred without any user effort apart from initiating the advance operation from an associated editor 280, 282, and without any apparent disruption of the user's editing context. Most importantly, if the user had also made changes to the component 232 since the previous advance, this exact same sequence of events would have resulted in those changes being saved as a part of the second version 218. Thus, the present invention allows rigorous version control without requiring heroic user efforts or explicit interaction with the coordinator 290.

6. How the coordinator 290 handles a user request to return a version being edited to its initial state:

In some cases, a user might wish to throw away all changes and restore the package version being edited to its state as of the last advance. For this situation, the coordinator 290 provides a "revert" command, which the user selects from the list of versioning commands provided by the editors 280, 282. When the user selects this command, that fact is communicated to the version handler for that package version by the component handler associated with the editing window from which the command was issued. The version handler then issues a revert message to the top-level component handler, which initiates a chain of revert messages that, through recursion, eventually reach all leaf-level component handlers (i.e., those component handlers associated with components being edited). When a leaf level component handler (e.g, the CH 320) receives the revert message, it causes its associated editor (e.g, the editor 280) to overwrite its editing buffer (e.g, the editing buffer 281) with the contents of its associated component (e.g., the CH 320) according to either of the two embodiments discussed in reference to FIGS. 6A and 6B.

A revert operation, by definition, always results in a clean version, even if the package version being reverted had formerly been dirty. Consequently, upon the completion of a revert operation, the version handler resets the is_dirty bit and sends a notify_version_dirty(FALSE) message to the top-level handler which message is recursively transmitted to all of the component handlers for that package version. This message informs all of the component handlers that they must return a set_version_dirty message to their version handler after the user's first keystroke in their editing buffer.

7. How the coordinator 290 handles checkout and checkin commands:

As set out above, in the preferred embodiment, the version management system 290 implements a simple versioning policy where the only way a new mainline version can be created is through a checkout-advance-checkin process. Moreover, in this versioning policy, only the leading edge version of a checkout branch can be advanced.

The user checks-out a package version by visiting the version to be checked out and then selecting the checkout command from the list of versioning commands displayed by an editor and designating the version to be checked-out. This causes the editor's related component handler to relay the appropriate checkout message to its associated version handler, which then asks the resource manager 286 to handle the checkout operation. Upon receiving a checkout message, the version management system 286 creates a new checkout branch version from the checked out mainline version and returns the address of the new checkout version to the calling version handler. The version handler then rolls forward to the new checkout version, which is mutable and has a different version name from the version checked out. Note that in the preferred embodiment there is maximum file sharing between the checkout branch version and the checked out mainline version (i.e., they each share the same set of components).

To keep users fully informed of the editing context shift caused by the checkout, the associated version handler (1) updates the names of its constituent components and the contextual names of their associated components (to indicate to users that they are editing a checkout version), and (2) changes the is_immutable result for the checkout version from no to yes (the version manager permitting advances to the checkout version but not the mainline version). The version handler also returns to any editors that are opened on components in the context of the checkout version a list of versioning commands that includes "advance" and "checkin". The user is then free to edit and advance the checkout version(s) to create a checkout chain, through a process wherein, each time a checkout version is advanced, the same version handler creates a new checkout version (sharing unmodified components with the previous checkout version) and rolls itself forward to the new checkout version as explained in examples 2 and 5.

When a user is done editing, he issues a checkin command, upon which the version management system 286 creates a new mainline version that is identical to the leading edge checkout version; the version handler associated with the leading edge checkout version then rolls forward to the new mainline version. A checkin involves little change to the structure of the data repository 294, but creates an editing context change which the version handler communicates to users by: (1) changing the version name (to reflect that the same version handler is now associated with the new mainline version), and (2) changing the result of the is_immutable message from no to yes (the version handler now being associated with a mainline version). After the checkin, the version handler is once again associated with an immutable mainline version, the only versioning commands available to users (provided by the get_verCommands message) are checkout and branch, where a branch is an operation where a user creates an immutable side branch of program development from any mainline package version. The branch operation does not involve the coordinator 290 and so is not described further.

C. Message Types Supported in the Editor-Component Handler Interface

As mentioned above, the editor-component handler interface 321a is customizable so as to allow any editor to be used with the versioning/editor coordinator 290. However, each editor coupled to a component handler must be able to perform a few basic functions required for versioning support and share related data with its associated component handler across the interface 321a. These basic editor functions and messages are listed in TABLE 3. Note that these functions are already performed by most editors.

TABLE 3

Editor Functions (1) keeping track of open editing buffers via a handler ticket supplied by its associated component handlers (each ticket gives the editor an invariant handle (i.e. pointer) to a buffer whose path/name might change due to versioning activity);

(2) receiving current buffer contents from its associated component handler (such as when the editor begins to edit a component);

(3) producing the current value (i.e., contents) of an editing buffer when asked by its component handler (this is required as part of an advance operation, where the component handler copies the contents of a changed editing buffer to a new component that is part of the advanced/new version);

(4) responding to name change messages from its component handlers by changing the name of the corresponding buffer (this occurs whenever the versioning context changes);

(5) responding to permission to edit (on/off) relayed by a component handler (permission to edit corresponds to the boolean variable, is_immutable, which is either true or false; when permission to edit is "off" (corresponding to version_immutable=true), the editor allows the user to alter the buffer and perform a limited set of versioning commands; the editor may display this information about editability to a user;

(6) optionally displaying a dirty_bit flag (when the is_dirty boolean is "true") during an editing session to let a user know when some component of the same package version has been edited (which tells a user when an advance is needed to make editing changes permanent);

(7) displaying a menu of available versioning operations provided by its associated component handler (the list is provided to a component handler by its version handler in response to the get_verCommands message), details of which operations are unknown to the editor; and (8) implementing the revert command by throwing away all changes to the specified editing buffer made since the last time the associated package was versioned.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A coordinator for integrating editing and versioning in a data repository wherein said data repository is a structured representation maintained in a computer memory of a software system having at least one package with at least one package version, each said version including at least one component, and wherein said editing involves using an editor to modify some of said components and said versioning includes allowing a user to mutate contents of one of said versions of a particular package to create a new version of said particular package while maintaining a record of existing versions of said particular package, said coordinator comprising:

a plurality of component handlers including a set of first component handlers, each respectively associated with a component being edited and said editor being used to edit said associated component, each said first component handler being configured to mediate all editing actions with versioning consequences made to said associated component using said editor; and a plurality of version handlers, each respectively associated with one of said package versions in which at least one of said components is open for editing and a set of second component handlers, including said first component handlers, associated with said components of said associated version, each said version handler being configured to monitor said editing actions with versioning consequences made to its associated version's components and to monitor versioning commands issued by said user with respect to said associated version, each said version handler, in response to said editing actions and said versioning commands, being configured to cause said second component handlers to implement versioning actions in cooperation with said editors open on said components so that said contents of said existing versions are immutable and said new versions alone reflect said editing actions and said versioning commands.

2. The coordinator of claim 1, wherein said structured representation is hierarchical, a plurality of said components being selected from file components or folder components, said folder components having at least one subcomponent selected from one of said file components or another of said folder components, said hierarchical representation including at least one top-level component selected from a first file component or a first folder component, each top-level component being associated with at least one of said package versions.

3. The coordinator of claim 1, wherein each component in an editing chain is associated with a component handler, said editing chain being the set of all components between and including said top-level component and each component being edited.

4. The coordinator of claim 3, wherein each of said components is identified by a unique path name specifying a subset of said editing chain up to and including said each component.

5. The coordinator of claim 3, wherein each of said component handlers is identified by a unique, hierarchical handler name identifying its associated package version handler and component.

6. The coordinator of claim 3, wherein said component handlers are instances of an abstract component handler object, said abstract component handler object encapsulating component handler routines and abstract component handler interfaces, said interfaces specifying component handler messages usable by said component handlers for communicating with their subhandlers and said version handler.

7. The coordinator of claim 6, wherein at least a subset of said component handler messages are selected from the group consisting of:
- a notify full name message informing a subhandler of its name, said name indicating said subhandler's associated version handler and component;
- a notify version immutable message to inform said subhandler whether or not to allow its associated component to be opened for editing by said editor;
- a notify version dirty message to inform said subhandler that some part of said version is dirty; an advance message asking said subhandler to create a new component representing currently edited values of its associated subcomponents;
- a revert message asking said subhandler to restore editing state of said subcomponent to that of said subcomponent immediately after prior advance;
- a lookup message asking said subhandler to open a new component handler for a first subcomponent named by an argument to said lookup message;
- a quit message asking said subhandler to unconditionally and recursively terminate all editing of its associated component and subcomponents of its associated component; and
- a get edit command message asking said subhandler to produce an editing command that, when executed, invokes editing on said subhandler's associated component;

such that, when said subhandler receives any of said messages, said subhandler performs actions required by said message and recursively relays said message to child component handlers associated with child components of said subhandler's associated component.

8. The coordinator of claim 3, wherein said version handlers are instances of an abstract version handler object, said abstract version handler object encapsulating version handler routines and an abstract version handler interface, said interface specifying version handler messages usable by said version handler for communicating with component handlers coupled to said version handler.

9. The coordinator of claim 8, wherein at least a subset of said version handler messages are selected from the set consisting of:
- an is immutable message sent by said version handler to said top-level component handler, said is immutable message indicating when true that no editing of components included in said version handler's package version is allowable;
- a set version dirty message, sent by a component handler to its associated version handler, said set version dirty message informing said associated version handler that one of its constituent components has been edited;
- an is dirty message that returns true when a user has made any change in any editor associated with said package version; and
- a get version commands message, sent by a component handler to its associated version handler, in response to which said version handler returns to said sending component handler a set of version commands that can be invoked from an editor associated with said component handler.

10. The coordinator of claim 1, further comprising an editing buffer opened on each component being edited, such that said editing by said editor occurs in said buffer, wherein said editor and said first component handler share editing information via an editor/component handler interface and wherein any editor interfaced with one of said first component handlers is configured to perform a standard set of versioning functions, at least a subset of which are selected from the group consisting of:
- keeping track of buffers according to a buffer ticket supplied by said first component handler;
- receiving buffer contents from said first component handler; producing a current value of said buffer when asked by said first component handler, said current value being current contents of said buffer;
- responding to name changes of said component by changing name of said buffer;
- responding to a permission to edit command relayed by said first component handler, said editor's associated component being uneditable when said permission to edit is false;
- displaying a dirty bit flag during an editing session;
- displaying a menu of versioning options provided by said handler, said versioning options being unknown to said editor; and
- implementing a revert command by throwing away all changes to said edit buffer since most current package version was created.

11. The coordinator of claim 10, wherein said editor/component handler interfaces are customizable so that any type of editor can be used to edit said components within said integrated versioning/editing system.

12. The coordinator of claim 1, wherein a single component can be shared among a plurality of package versions.

13. A computer readable memory that can be used to direct a computer to integrate editing and versioning in a data repository, wherein said data repository is a structured representation maintained in said computer memory of a software system having at least one package with at least one package version, each said version including at least one component, and wherein said editing involves using an editor to modify some of said components and said versioning includes allowing a user to mutate contents of one of said package versions while maintaining a record of existing versions and creating a new version, said computer readable memory comprising:
- a plurality of component handlers including a set of first component handlers, each respectively associated with a component being edited and said editor being used to edit said associated component, said editor communicating with said associated component via one of said first component handlers, each said first component handler mediating all editing actions with versioning consequences made to said associated component using said editor; and
- a plurality of version handlers, each respectively associated with one of said package versions in which at least one of said components is open for editing and a set of second component handlers, including said first component handlers, associated with said components of said associated version, such that each of said second component handlers is configured to communicate occurrence of said editing actions with versioning consequences and versioning commands issued by said user to said associated version handler, said associated version handler being configured to responsively cause said associated component handlers to implement versioning actions in cooperation with said editors open on said components so that said contents of said existing versions are immutable and said new versions alone reflect said editing actions and said versioning commands.

14. The computer readable memory of claim 13, wherein said component handlers are instances of an abstract component handler object, said abstract component handler object encapsulating component handler routines and abstract component handler interfaces, said interfaces specifying component handler messages usable by said component handlers for communicating with their subhandlers and said version handler.

15. The computer readable memory of claim 14, wherein at least a subset of said component handler messages are selected from the group consisting of:
 a notify full name message informing a subhandler of its name, said name indicating said subhandler's associated version handler and component;
 a notify version immutable message to inform said subhandler whether or not to allow its associated component to be opened for editing by said editor;
 a notify version dirty message to inform said subhandler that some part of said version is dirty;
 an advance message asking said subhandler to create a new component representing currently edited values of its associated subcomponents;
 a revert message asking said subhandler to restore editing state of said subcomponent to that of said subcomponent immediately after prior advance;
 a lookup message asking said subhandler to open a new component handler for a first subcomponent named by an argument to said lookup message;
 a quit message asking said subhandler to unconditionally and recursively terminate all editing of its associated component and subcomponents of its associated component; and
 a get edit command message asking said subhandler to produce an editing command that, when executed, invokes editing on said subhandler's associated component;
 such that, when said subhandler receives any of said messages, said subhandler performs actions required by said message and recursively relays said message to child component handlers associated with child components of said subhandler's associated component.

16. The computer readable memory of claim 13, wherein said version handlers are instances of an abstract version handler object, said abstract version handler object encapsulating version handler routines and an abstract version handler interface, said interface specifying version handler messages usable by said version handler for communicating with component handlers coupled to said version handler.

17. The computer readable memory of claim 16, wherein at least a subset of said version handler messages are selected from the set consisting of:
 an is immutable message sent by said version handler to said top-level component handler, said is immutable message indicating when true that no editing of components included in said version handler's package version is allowable;
 a set version dirty message, sent by a component handler to its associated version handler, said set version dirty message informing said associated version handler that one of its constituent components has been edited;
 an is dirty message that returns true when a user has made any change in any editor associated with said package version; and
 a get version commands message, sent by a component handler to its associated version handler, in response to which said version handler returns to said sending component handler a set of version commands that can be invoked from an editor associated with said component handler.

18. A method for integrating editing and versioning in a data repository, wherein said data repository is a structured representation maintained in a computer memory of a software system having at least one package with at least one package version, each said version being represented in the structured representation as an immutable collection of at least one component, said structured representation storing information about said packages, package versions and components so that any of said package versions is recoverable from said structured representation, said method comprising the steps of:
 monitoring editing actions made to said components associated with a particular package version as said at least one component is being edited with an editor;
 monitoring all versioning commands issued by any user with respect to said particular package version as said at least one component is being edited; and
 updating said structured representation based on occurrence of editing actions with versioning consequences and said versioning commands as said at least one component is being edited so that said editing actions and versioning commands result in creation of at least one new package version without affecting contents of existing package versions.

19. The method of claim 18, wherein:
 said step of monitoring said editing actions is performed by a component handler coupled to each respective edited component and editors being used to edit said components, said component handler providing an exclusive interface between each respective component and said editor;
 said step of monitoring said versioning commands for said one package version is performed by one version handler associated with said one package version, said one version handler being coupled to each component handler associated with said one package version, said associated component handlers relaying respective component handler messages to said version handler indicating occurrence of respective ones of said editing actions; and
 said step of updating said structured representation is collaboratively performed by said component handlers and said one version handler, said version handler controlling said component handlers and said component handlers controlling said editors so that said versioning commands are executed in a coordinated fashion, existing versions remain immutable and editing of a package continues seamlessly.

20. The method of claim 19, wherein component handlers and one version handler associated with a package version communicate according to a plurality of abstract interfaces including at least a component handler interface and a version handler interface, said abstract interfaces permitting said one version handler to communicate with said component handlers associated with said package version and vice-versa, and permitting said component handlers to communicate with each other so as to allow said versioning commands to be executed in a coordinated fashion.

21. The method of claim 19, wherein component handlers and their associated editors communicate using an editor/component handler interface that is customized for each editor with which a component handler is associated, said editor/component handler interface enabling said editors and said component handlers to exchange information to support said versioning functions of said component handlers and said version handler.

22. The method of claim 19, wherein, when said versioning command is "advance", calling for advancing a selected package version having a selected version handler, and an editing action with versioning consequences has not occurred in any of said components of said package version, said step of updating said structured representation comprises:

creating a new package version of said package, said new package version having constituent components whose contents are unchanged from said selected package version;

rolling forward said selected version handler to be associated with said new package version rather than said selected package version;

retaining associations between said selected version handler and all selected component handlers with which said selected version was associated before said advance action occurred, so that a user is able to continue editing said package after said advance action is completed, said new package version being edited rather than said selected package version; and retaining said current version as one of said back versions.

23. The method of claim 19, wherein, when said versioning command is "advance", calling for advancing a selected package version having a selected version handler, and an editing action with versioning consequences has occurred in any of said components of said package version, said step of updating said structured representation comprises:

said version handler issuing advance commands to component handlers associated with said selected package version, said advance commands causing said selected component handlers to cause results of editing changes to their associated selected components to be saved as new components;

creating a new package version of said package, said new version including said new components and all unchanged selected components; rolling forward said selected version handler to be associated with said new package version rather than said selected package version;

retaining associations between said selected version handler and all selected component handlers with which said selected version was associated before said advance action occurred, so that a user is able to continue editing said package after said advance action is completed, said new package version being edited rather than said selected package version; and retaining said selected version as a back version of said package.

24. The method of claim 19, wherein, when said editing action with versioning consequences comprises a user making editing changes to a first component of said one package version before editing changes have been made to any other components of said one package, said step of updating said structured representation comprises:

a first component handler associated with said first component passing a version dirty message to a first version handler associated with said one package version;

said first version handler causing a notify_version_dirty message to be sent to a first set of component handlers consisting of component handlers associated with said one package version which are also associated with components of said one package version being edited; and said first set notifying said associated editors that one of said components associated with said one package version has been changed.

25. The method of claim 19, wherein, when said versioning command is "check out", calling for the creation of an editable checkout branch of program development from an immutable mainline version, said step of updating said structured representation comprises the steps of:

creating a checkout package version that is identical to said unadvanceable mainline version, components of said checkout package version being freely editable;

rolling forward a first version handler associated with said mainline version to be associated with said checkout package version; and informing users editing said checkout package version that they are editing said checkout package version and that said checkout package version is advanceable.

26. The method of claim 25, wherein, when a user issues an "advance" command from within a first checkout package version, said step of updating said structured representation further comprises:

said checkout version handler causing component handlers associated with edited components of said first checkout package version to cause results of editing changes to their associated components to be saved as new components in a new checkout version.

27. The method of claim 26, wherein, when a user issues a "checkin" command from within a particular checkout package version, said particular checkout package version being associated with said first version handler, said step of updating said structured representation further comprises:

constructing a new mainline package version from components of said particular version handler;

rolling forward said first version handler from said particular checkout package version to said new mainline package version; and informing users editing said mainline package version that they are editing said mainline package version and that said mainline package version is not advanceable.

* * * * *